(12) United States Patent
Walker et al.

(10) Patent No.: US 7,386,508 B1
(45) Date of Patent: Jun. 10, 2008

(54) METHOD AND APPARATUS FOR FACILITATING A TRANSACTION BETWEEN A BUYER AND ONE SELLER

(75) Inventors: Jay S. Walker, Ridgefield, CT (US); Daniel E. Tedesco, New Canaan, CT (US); Magdalena Mik, Greenwich, CT (US)

(73) Assignee: priceline.com, Incorporated, Norwalk, CT (US)

( * ) Notice: Subject to any disclaimer, the term of this patent is extended or adjusted under 35 U.S.C. 154(b) by 0 days.

(21) Appl. No.: 09/220,191

(22) Filed: Dec. 23, 1998

Related U.S. Application Data

(63) Continuation-in-part of application No. 09/190,744, filed on Nov. 12, 1998, now abandoned, which is a continuation-in-part of application No. 09/058,840, filed on Apr. 13, 1998, which is a continuation-in-part of application No. 08/889,319, filed on Jul. 8, 1997, now Pat. No. 6,085,169, which is a continuation-in-part of application No. 08/707,660, filed on Sep. 4, 1996, now Pat. No. 5,794,207, application No. 09/220,191, and a continuation-in-part of application No. 08/997,170, filed on Dec. 22, 1997, now Pat. No. 6,356,878, which is a continuation-in-part of application No. 08/943,266, filed on Oct. 3, 1997, now Pat. No. 6,418,415, and a continuation-in-part of application No. 08/923,683, filed on Sep. 4, 1997.

(51) Int. Cl.
*G06Q 30/00* (2006.01)
(52) U.S. Cl. .............. 705/39; 705/26; 705/27; 705/37; 705/40
(58) Field of Classification Search ............ 705/37, 705/26, 1, 27, 39, 40, 80

See application file for complete search history.

(56) References Cited

U.S. PATENT DOCUMENTS 3,573,747 A    4/1971   Adams et al.

(Continued)

FOREIGN PATENT DOCUMENTS

EP   0 512 702 A2   11/1992

(Continued)

OTHER PUBLICATIONS

Fishkin, Ken, Foresight Exchange Tutorial: (http://www.ideosphere.com/fx/docs/tutorial.html) Feb. 19, 1999 at p. 1-5.

(Continued)

*Primary Examiner*—Nga Nguyen
(74) *Attorney, Agent, or Firm*—Chadbourne & Parke LLP; Walter G. Hanchuk

(57) ABSTRACT

A seller server receives an offer which specifies a type of product (e.g. a seat on a flight), at least one condition (e.g. destination and date of departure), and an offer price specified by a buyer. The seller server also receives an associated payment identifier that specifies a financial account, such as a credit card account. The payment identifier essentially "guarantees" the offer in that the seller may receive payment from the financial account even if the buyer attempts to renege. The seller determines whether to accept the offer, based on various factors such as the offer price and the availability of appropriate products to satisfy the conditions of the offer. If the offer is accepted, payment is provided to the seller using the payment identifier.

38 Claims, 15 Drawing Sheets

U.S. PATENT DOCUMENTS

| | | | |
|---|---|---|---|
| 4,247,759 A | 1/1981 | Yuris et al. | |
| 4,449,186 A | 5/1984 | Kelly et al. | |
| 4,553,222 A | 11/1985 | Kurland et al. | |
| 4,677,552 A | 6/1987 | Sibley, Jr. | |
| 4,751,728 A | 6/1988 | Treat | |
| 4,789,928 A | 12/1988 | Fujisaki | |
| 4,799,156 A | 1/1989 | Shavit et al. | |
| 4,903,201 A | 2/1990 | Wagner | |
| 4,931,932 A | 6/1990 | Dalnekoff et al. | |
| 5,021,953 A | 6/1991 | Webber et al. | |
| 5,101,353 A | 3/1992 | Lupien et al. | |
| 5,136,501 A | 8/1992 | Silverman et al. | |
| 5,168,446 A | 12/1992 | Wiseman | |
| 5,191,523 A | 3/1993 | Whitesage | |
| 5,191,613 A | 3/1993 | Graziano et al. | |
| 5,224,034 A | 6/1993 | Katz et al. | |
| 5,243,515 A | 9/1993 | Lee | |
| 5,253,165 A | 10/1993 | Leiseca et al. | |
| 5,262,941 A | 11/1993 | Saladin et al. | |
| 5,283,731 A | 2/1994 | Lalonde et al. | |
| 5,297,031 A | 3/1994 | Gutterman et al. | |
| 5,329,589 A | 7/1994 | Fraser et al. | |
| 5,361,199 A | 11/1994 | Shoquist et al. | |
| 5,375,055 A | 12/1994 | Togher et al. | |
| 5,404,291 A | 4/1995 | Kerr et al. | |
| 5,420,914 A | 5/1995 | Blumhardt | |
| 5,426,281 A | 6/1995 | Abecassis | |
| 5,444,630 A | 8/1995 | Dlugos | |
| 5,467,269 A | 11/1995 | Flaten | |
| 5,500,793 A | 3/1996 | Deming, Jr. et al. | |
| 5,517,555 A | 5/1996 | Amadon et al. | |
| 5,519,769 A | 5/1996 | Weinberger et al. | |
| 5,553,131 A | 9/1996 | Minervino, Jr. et al. | |
| 5,557,517 A | 9/1996 | Daughterty, III | |
| 5,557,518 A | 9/1996 | Rosen | |
| 5,570,283 A | 10/1996 | Shoolery et al. | |
| 5,592,375 A | 1/1997 | Salmon et al. | |
| 5,606,602 A | 2/1997 | Johnson et al. | |
| 5,611,052 A | 3/1997 | Dykstra et al. | |
| 5,615,269 A | 3/1997 | Micali | |
| 5,640,390 A | 6/1997 | Sakamoto et al. | |
| 5,664,115 A | 9/1997 | Fraser | |
| 5,689,652 A | 11/1997 | Lupien et al. | |
| 5,694,551 A | 12/1997 | Doyle et al. | |
| 5,696,965 A | 12/1997 | Dedrick | |
| 5,717,989 A | 2/1998 | Tozzoli et al. | |
| 5,732,400 A | 3/1998 | Mandler et al. | |
| 5,745,882 A | 4/1998 | Bixler et al. | |
| 5,757,917 A | 5/1998 | Rose et al. | |
| 5,758,328 A * | 5/1998 | Giovannoli | 705/26 |
| 5,794,207 A | 8/1998 | Walker et al. | |
| 5,794,219 A | 8/1998 | Brown | |
| 5,797,127 A | 8/1998 | Walker et al. | |
| 5,799,285 A | 8/1998 | Klingman | |
| 5,822,737 A | 10/1998 | Ogram | |
| 5,826,244 A | 10/1998 | Huberman | |
| 5,832,452 A | 11/1998 | Schneider et al. | |
| 5,835,896 A | 11/1998 | Fisher et al. | |
| 5,845,265 A | 12/1998 | Woolston | |
| 7,133,835 B1 * | 11/2006 | Fusz et al. | 705/26 |

FOREIGN PATENT DOCUMENTS

| | | |
|---|---|---|
| EP | 512 702 A2 | 11/1992 |
| WO | 95/16971 | 6/1995 |
| WO | 96/13013 | 5/1996 |
| WO | 96/34356 | 10/1996 |
| WO | 97/46961 | 12/1997 |
| WO | 98/10361 | 3/1998 |

OTHER PUBLICATIONS

"Bid.com 1998 Third-Quarter Revenue Increases 12.5 Percent From Second Quarter", Business Wire, Oct. 29, 1998.
Final Report: Virtual Hospital (http://www.telemed.medadmin.uiowa.edu/TRCDocs/Pubs/FinalReport/cVirtualH/virtualH/virtualh02.html), download date: Sep. 20, 1998.
"First Source Become a Member", More Reasons To Join First Source! (http://www.fsource.com/bene/html), download date: Sep. 20, 1998.
Jeffrey Davis, "Big Storm rising", Business 2.0, Sep. 1998 at p. 60.
Suite 101.com (http://www.suite101.com/doc.cfm.presskit/questions), 1998.
Web Marketing Today (http://www.wilsonweb.com/rfwilson/wmt2/issue36htm) dated Sep. 1, 1997, download date: Sep. 17, 1998.
"Free Stuff Internet Site Delivers for Viewers and Advertisers Alike", Press Release of PromoNet Interactive, Inc. dated Nov. 10, 1997.
About lao, selected pages downloaded from www.iaoauction.com on Sep. 8, 1997 and Sep. 18, 1997.
Onsale: Auction Supersite, selected pages downloaded from www.onsale.com on Sep. 8, 1997.
Hapgood, Fred bidder Harvest, Sep. 1997, p. 58.
NASDAQ: What is NASDAQ?, selected pages downloaded from http://home.axford.com on Aug. 15, 1997.
NASDAQ Consolidated Subscriber Agreement, downloaded from www.pcquote.com/exchanges on Aug. 15, 1997.
TradingFloor: General Trading Information and Terms, downloaded from www.tradingfloor.com on Aug. 14, 1997.
HomeShark: Refinance Check, selected pages downloaded from www.homeshark.com on Aug. 13, 1997.
The Loan Process, downloaded from www.sdtech.com/mls/process on Aug. 7, 1997.
Trade-Direct: We Help You Trade With Confidence, selected pages downloaded from www.trade-direct.com on Aug. 6, 1997.
Classifieds2000: The Internet Classifieds, selected pages downloaded from www.classifieds2000.com on Aug. 6, 1997.
Internet Mortgage Service Eliminates Loan Agents and Passes Commissions on to the Consumer, Company Press Release, Yahoo Business Wire (Jun. 30, 1997).
Frequently Asked Questions About: Airhitch, selected pages downloaded from www.isicom.com.fr/airhitch on May 6, 1997.
Hitch a Flight to Europe, selected pages downloaded from www.travelassist.com on May 6, 1997.
Airhitch: Your Way to Low Cost Travel, selected pages downloaded from www.vaportrails.com on May 6, 1997.
Kelsey, J. and Schneier, B., Conditional Purchase Orders, 4th ACM Conference on Computer and Communications Security, ACM Press, 117-114 (Apr. 1997).
Bryant, Adam, "Shaking Up Air Fares' Status Quo", The New York Times, Mar. 31, 1997.
Silverman, Robert, "GM Drives Wed Ad Insertion Network", Inside Media, Feb. 26, 1997, vol. 9, No. 4, p. 1; ISSN:1046-5316.
"Flycast Introduces Unique 'Open Exchange' Match-Making Service", Interactive Marketing News, Feb. 21, 1997, vol. 4, No. 8.
"UK's" World Telecom Unveils New WorldSaver Tariffs, Newsbytes, Information Access Company (Feb. 13, 1997).
"TransQuest and Web Ventures Deliver Internet Booking for Delta Air Lines", PR Newswire, Dec. 10, 1996, Financial News Section.
"Affinicast Enables Web Sites That Listen and Adapt to Customer Affinities", PR Newswire, Dec. 3, 1996.
"Web Ventures Presents BookIt!" press release printed from http://www/webventures.com/bookit/(Web Ventures World Wide Web site) on Dec. 2, 1996.
"World's First Real-Time Travel Auction Service to Be Available Via World Wide Web: ETA To Open Bidding to Consumers," Business Wire, DIALOG Trade & Industry Database (Nov. 4, 1996).
Gessel, Chris "Trade Smarter: The Limit of Orders", Investor's Business Daily, Oct. 14, 1996, p. A1.
CREST: Cruise/Ferry Revenue Management System, selected pages downloaded from www.rtscorp.com on Aug. 5, 1996.

Nishimoto, Lisa, "Travel Services Are First Online Commerce Offerings to Fly," Infoworld, Jul. 29, 1996, downloaded from http://www.infoworld.com.
About Rate Hunter, downloaded from http://207.49.64.77//rhprodrh.htm on Jul. 14, 1996.
Cathay Pacific Online Ticket Bidding, World Internet News Digest (May 8, 1996).
Sothbey's General Information, downloaded from www.sothebys.com (1996).
CyberBid, Net Fun Ltd.(1996).
Nimmer, Raymond, T., "Electronic Contracting; Legal Issues", 14 J. Marshall J.Computer & Info L.211, Winter, 1996.
American Law Institute, Draft-Uniform Commercial Code Revised Article 2 (Sales), parts 2, 3, and 7, pp. 1-15, Jan. 4, 1996.
Speidel, Richard E. & Schott, Lee A., "Impact of Electronic Contracting on Contract Formation Under Revised UCC Article 2, Sales",C878 ALI-ABA 335, Dec. 9, 1993.
Hainer, Cathy and Grossman,Cathy Lynn, "Where Vacationing Kids Get Good Care", USA Today, Apr. 1, 1992, at p. 4D.
Del Russo, Laura, "Ticket-Bidding Firm Closes Its Door," Travel Weekly, Mar. 12, 1992.
"Newsletters", The Atlanta Constitution, Mar. 1, 1992, p. K13.
"CRTL's Blue Ribbon Deals for 1992", Consumer Reports Travel Letter, Jan. 1992, vol. 8, No. 1, at pp. 3-5.
Traveler's Notes; Bookit Report, Consumer Reports Travel Letter, Dec. 1991 at p. 143.
Feldman, Joan M., "To Rein In Those CRSs; Computer Reservation Systems", Air Transport World, Dec. 1991, at p. 89.
"Money Briefs; Buy Low, Fly High", Gannet News Service, Nov. 20, 1991.
"Buy Low, Fly High", USA Today, Nov. 14, 1991 at p. 15.
Traveler's Notes; Easier Airfare Bidding, Consumer Reports Travel Letter, Oct. 1991 at p. 119.
Nelson, Janet "Practical Traveler; Airlines Relaxing Policy on No-Refund Tickets", The New York Times, Sep. 22, 1991 at p. 3 of Section 5.
Pelline, Jeff, "New Service; Now You Can Make a Bid on Your Next Airline Ticket Home", The Orange County Register, Sep. 1, 1991 at p. E01.
"Bookit Airfare Bidding System (Fax for Your Plane Ticket?)", Consumer Reports Travel Letter, Sep. 1991, pp. 97 & 106.
Upton, Kim "French Say Monoliths Off-limits to Visitors", Los Angeles Times, Aug. 25, 1991.
Pelline, Jeff, "Travelers Bidding on Airline Tickets; SF Firm Offers Chance for Cut-Rate Fares", San Francisco Chronicle, Section A4, Aug. 19, 1991.
Carey, Christopher, "Firm Offers Auction For Airline Tickets", St. Louis Post-Dispatch, Aug. 7, 1991 at p. 1B.
Del Rosso, Laura, "Marketel Says It Plans to Launch Air Fare 'Auction' in June", Travel Weekly, Apr. 29, 1991.
NASDAQ Adds Enhancemnets to SOES Limit Order File, Securities Week, Nov. 26, 1990, p. 5.
Ritter, Jeffrey B., "Scope of the Uniform Commercial Code: Computer Contracting Cases and Electrical Commercial Practices", 45 Bus. Law 2533, Aug. 1990.
Greenburg, Peter, S., "Judging DeRegulation", The Record, Jul. 22, 1990 at p. T01.
Greenburg, Peter, S., "The Savvy Traveler: Lower Air Fares for Consumers Not in the Cards; Airlines: Remember When It Cost $16 to fly From Los Angeles to San Francisco? Then You Remember the Days Before DeRegulation. Since Then, Prices Have Soared", Los Angeles Times, Jul. 8, 1990 at p. L2.
Wallace, David, "Company Planning to Let Fliers Bid on Airfares", Philadelphia Business Journal, Mar. 26, 1990 at p. 15.
Koepper, Ken, "Room Inventory Auctioning: The Next CRS Generation", Lodging, Jan. 1990 at p. 26, 29-30.
"Letter to Business Extra", The San Francisco Chronicle, Dec. 26, 1989 at p. C7.
Schrage, Michael, "An Experiment in Economic Theory; Labs Testing Real Markets", The Record Section B1, Nov. 26, 1989.
Schrage, Michael Innovation/Micheal Schrage: Laboratory Experiments with Market Economics, Los Angeles Times, Nov. 23, 1989 at p. D1.
Golden, Fran "AAL's Riga Doubts Marketel's Appeal to Retailers", Travel Weekly, Nov. 13, 1989.
Del Rosso, Laura, Firm Proposes ticket-bidding system; Marketel explores electronic auction of travel; Marketel International., Travel Weekly, Section No. 91, vol. 48, p. 1; Nov. 13, 1989.
Carlsen, Clifford, "Polaris Group Set to Fly the Leveraged Sky", San Francisco Business Times, Nov. 6, 1989 at p. 1.
Kuttner, Robert, "Computers May Turn the World into One Big Commodities Pit", Business Week, Sep. 11, 1989.
Carlsen, Clifford, "From Airline Tickets to Human Organs, the Electronic Markets Are Booming", San Francisco Business Times, Aug. 14, 1989 at p. 17.
"Public May Submit Bids To Get Bargain Rates", Wall Street Journal, Section 2; p. 1, col. 1; Aug. 1, 1989.
American Airlines Internet Silent Auction, selected pages downloaded from www.americanair.com.
Apollo Host Computer, selected pages downloaded from www.apollo.com.
"Auctioning unsold airline tickets." (http://www.newciv.org/GIB/BOV/BV-409.HTMI), at p. 1.
Cathay Pacific:Cyber Traveler Auction #3—Official Rules, selected pages downloaded from www.cathaypacific.com.
CSM Online: About Collector's Super Mall downloaded from www/csmonline.com.
Sabre Decision Technologies, selected pages downloaded from www.sabre.com.
PhoneMiser: Frequently Asked Questions, downloaded from www.phonemiser.com.
The United Computer Exchange: How It All Works, selected pages downloaded from www.uce.com.
Tired of Shopping For the Best Home Loan?, Mortgage Loan Specialists.
Hensley, H.G., "I'll Take Jarez," Travel Weekly, vol. 45, p. 7, Feb. 1986.
Gibson, R., et al., "Marketing:Fast-Food Chains Hope Diners Swallow New 'Value' Menu of Higher-Priced Items," The Wall Street Journal, Mar. 13, 1992, p. B1.
Anonymous, "Another Reason to Love Those Afluent Customers," Jewelers' Circular-Keystone, vol. CLXX, No. 7, p. 64, Jul. 1999.

* cited by examiner

| BUYER IDENTIFIER 320 | NAME 322 | E-MAIL 324 | ADDRESS 326 | PHONE NUMBER (DAY) 328 | PHONE NUMBER (EVE.) 330 | PAYMENT IDENTIFIER 332 |
|---|---|---|---|---|---|---|
| B12345 | JOHN DOE | DOE@AOL.COM | 10 CURVING LN. TOWN, CT 20231 | (555) 222-3015 | (555) 333-7091 | MASTERCARD 1111-1111-1111-1111 |
| B12350 | MARY TULLEY | M@T.COM | 1 MAIN ST. ANYWHERE, USA | (555) 555-5555 | (555) 555-0000 | AMEX 2222-2222-2222-2222 |

FIG. 3

| FLIGHT NUMBER 420 | FLIGHT DATE 422 | ORIGINATION AIRPORT 424 | DESTINATION AIRPORT 426 | DEPARTURE TIME 428 | ARRIVAL TIME 430 | SEATS AVAILABLE (COACH) 432 | SEATS AVAILABLE (BUSINESS) 434 |
|---|---|---|---|---|---|---|---|
| 342 | 2/13/99 | JFK | ORD | 7:39 AM | 10:54 AM | 38 | 62 |
| 677 | 2/13/99 | JFK | ORD | 9:19 AM | 12:34 PM | 19 | 8 |
| 200 | 2/13/99 | LGA | MDA | 3:25 PM | 6:18 PM | 3 | 7 |

FIG. 4

| OFFER IDENTIFIER 520 | BUYER IDENTIFIER 522 | PAYMENT IDENTIFIER 524 | OFFER PRICE 526 | OFFER CONDITIONS 528 | ACCEPTED? 530 | PRODUCT(S) PURCHASED 532 |
|---|---|---|---|---|---|---|
| 06894 | B12340 | VISA 1111-1111-1111-1111 | $500.00 | DEPART: 12/13/99; RETURN: 12/18/99; ORIGINATION: NY; DESTINATION: LA; NUMBER TICKETS: 1 | YES | FLIGHT 200 LGA→ MDA 2/13/99 FLIGHT 4128 MDA→ LAX 2/13/99 FLIGHT 391 LAX→ MDW 2/18/99 FLIGHT 914 MDW→ LGA 2/18/99 |
| 81320 | B12345 | MASTERCARD 2222-2222-2222-2222 | $1,400; 10,000 FREQUENT FLYER MILES | DEPART: 1/18/99; RETURN: 1/19/99; ORIGINATION: NY; DESTINATION: LA; NUMBER TICKETS: 7 | NO | N/A |

FIG. 5

| ORIGINATION 620 | DESTINATION 622 | DEPARTURE DATE 624 | OFFER PRICE 626 | UNITS OF DEMAND 630 | STATUS 632 |
|---|---|---|---|---|---|
| NEW YORK, NY | LOS ANGELES, CA | 2/13/99 | $500.00 | 2 | ACCEPTED |
| BOSTON, MA | SAN DIEGO, CA | 4/1/99 | $300.00 | 4 | NOT ACCEPTED |
| CHICAGO, IL | FT. LAUDERDALE, FL | 3/3/99 | $150.00 | 2 | ACCEPTED |

FIG. 6

METHOD AND APPARATUS FOR FACILITATING A TRANSACTION BETWEEN A BUYER AND ONE SELLER

CROSS-REFERENCE TO CO-PENDING APPLICATIONS

The present application is a continuation-in-part application of patent application Ser. No. 09/190,744 entitled METHOD AND APPARATUS FOR A CRYPTOGRAPHICALLY ASSISTED COMMERCIAL NETWORK SYSTEM DESIGNED TO FACILITATE BUYER-DRIVEN CONDITIONAL PURCHASE OFFERS" to Bruce Schneier, James A. Jorasch and Jay S. Walker filed on Nov. 12, 1998 now abandoned, which is a continuation-in-part of co-pending U.S. patent application Ser. No. 09/058,840 entitled "METHOD AND APPARATUS FOR A CRYPTOGRAPHICALLY ASSISTED COMMERCIAL NETWORK SYSTEM DESIGNED TO FACILITATE BUYER-DRIVEN CONDITIONAL PURCHASE OFFERS" to Bruce Schneier, James A. Jorasch and Jay S. Walker filed on Apr. 13, 1998, which is a continuation-in-part of U.S. patent application Ser. No. 08/889,319 entitled "CONDITIONAL PURCHASE OFFER MANAGEMENT SYSTEM" to Bruce Schneier, James A. Jorasch, Jay S. Walker and T. Scott Case filed on Jul. 8, 1997 now U.S. Pat. No. 6,085,169, which is a continuation-in-part of U.S. patent application Ser. No. 08/707,660 filed Sep. 4, 1996, now U.S. Pat. No. 5,794,207 entitled "METHOD AND APPARATUS FOR A CRYPTOGRAPHICALLY ASSISTED COMMERCIAL NETWORK SYSTEM DESIGNED TO FACILITATE BUYER-DRIVEN CONDITIONAL PURCHASE OFFERS" issued on Aug. 11, 1998 to Bruce Schneier, James A. Jorasch and Jay S. Walker; and a continuation-in-part of U.S. patent application Ser. No. 08/997,170 entitled "CONDITIONAL PURCHASE OFFER BUYER AGENCY SYSTEM" to Andrew S. Van Luchene, Daniel E. Tedesco, James A. Jorasch, Jay S. Walker and Thomas M. Sparico filed on Dec. 22, 1997 now U.S. Pat. No. 6,356,878, which is a continuation-in-part of co-pending U.S. patent application Ser. No. 08/923,683 entitled "CONDITIONAL PURCHASE OFFER (CPO) MANAGEMENT SYSTEM FOR PACKAGES" to Andrew S. Van Luchene, Daniel E. Tedesco, James A. Jorasch, Jay S. Walker and T. Scott Case filed on Sep. 4, 1997 and a continuation-in-part of U.S. patent application Ser. No. 08/943,266 entitled "SYSTEM AND METHOD FOR AGGREGATING MULTIPLE BUYERS UTILIZING CONDITIONAL PURCHASE OFFERS (CPOs) to Daniel E. Tedesco, James A. Jorasch and Jay S. Walker filed on Oct. 3, 1997 now U.S. Pat. No. 6,418,415, each incorporated herein by reference.

CROSS-REFERENCE TO CO-PENDING RELATED APPLICATIONS

This application is related to the following co-pending U.S. patent applications: Ser. No. 08/923,530 entitled "CONDITIONAL PURCHASE OFFER MANAGEMENT SYSTEM FOR EVENT TICKETS" to Andrew S. Van Luchene, Bruce Schneier, James A. Jorasch, Jay S. Walker, Robert R. Lech and Thomas M. Sparico filed on Sep. 4, 1997; Ser. No. 08/923,317 entitled "CONDITIONAL PURCHASE OFFER MANAGEMENT SYSTEM FOR TELEPHONE CALLS" to Bruce Schneier, Jay S. Walker and Thomas M. Sparico filed on Sep. 4, 1997; Ser. No. 08/964,967 entitled "CONDITIONAL PURCHASE OFFER (CPO) MANAGEMENT SYSTEM FOR COLLECTIBLES" to Andrew S. Van Luchene and Jay S. Walker filed on Nov. 5, 1997; Ser. No. 08/923,524 entitled "CONDITIONAL PURCHASE OFFER (CPO) AND THIRD-PARTY INPUT MANAGEMENT SYSTEM" to Bruce Schneier, Jay S. Walker, Sanjay K. Jindal and Toby Weir-Jones filed on Sep. 4, 1997; Ser. No. 08/969,875 entitled "CONDITIONAL PURCHASE OFFER (CPO) MANAGEMENT SYSTEM FOR VEHICLE LEASES" to Jay S. Walker and Toby Weir-Jones filed on Nov. 14, 1997; Ser. No. 08/923,618 entitled "CONDITIONAL PURCHASE OFFER MANAGEMENT SYSTEM FOR CRUISES" to Bruce Schneier, Jay S. Walker, T. Scott Case and Thomas M. Sparico filed on Sep. 4, 1997; Ser. No. 08/943,483 entitled "SYSTEM AND METHOD FOR FACILITATING ACCEPTANCE OF CONDITIONAL PURCHASE OFFERS (CPOs) to Andrew S. Van Luchene, Daniel E. Tedesco, James A. Jorasch, Jay S. Walker and Thomas M. Sparico filed on Oct. 3, 1997; Ser. No. 09/205,824 entitled "DYNAMIC QUALITY CONTROL CONDITIONAL PURCHASE OFFER (CPO) MANAGEMENT SYSTEM" to Daniel E. Tedesco, James A. Jorasch, Jay S. Walker and T. Scott Case filed on Dec. 4, 1998; Ser. No. 09/205,663 entitled "METHOD AND SYSTEM FOR UTILIZING A PSYCHOGRAPHIC QUESTIONNAIRE IN A BUYER-DRIVEN COMMERCE SYSTEM" to Daniel E. Tedesco, James A. Jorasch and Jay S. Walker filed on Dec. 4, 1998; Ser. No. 09/205,666 entitled "CUSTOMER PROFIT SHARING CONDITIONAL PURCHASE OFFER (CPO) MANAGEMENT SYSTEM" to Daniel E. Tedesco, Jay S. Walker and T. Scott Case filed on Dec. 4, 1998; and Ser. No. 09/205,787 entitled "SYSTEM AND METHOD FOR MOTIVATING SUBMISSION OF CONDITIONAL PURCHASE OFFERS" to Daniel E. Tedesco, Jay S. Walker, T. Scott Case and Tracy Hartmann filed on Dec. 4, 1998, each incorporated herein by reference.

FIELD OF THE INVENTION

The present invention relates to a method and apparatus for facilitating transactions between buyers and sellers.

BACKGROUND OF THE INVENTION

Sellers of various products typically advertise a predetermined price for a product, and customers pay that price for the product. The parent applications of the present application describe a method and apparatus that permits sellers to accept "conditional purchase offers" from buyers, in which a conditional purchase offer specifies a price the buyer is willing to pay for the product. Each conditional purchase offer is further associated with a payment identifier that specifies a financial account to "guarantee" the offer. If a seller accepts the offer, then that seller can be paid using the payment identifier. Even if the buyer later reneges, the payment identifier guarantees that the seller receives appropriate compensation, typically either the full offer price or a predetermined penalty payment.

The inventions disclosed in the parent applications are especially advantageous in selling excess, perishable inventory such as seats on airline flights. For example, the marginal cost to an airline of selling an additional seat is extremely low. Accordingly, it can be profitable to sell a seat for a low, buyer-specified offer price, especially if the chance of otherwise selling the seat is small (e.g. soon before the flight departs).

However, for various reasons, sellers may believe, correctly or incorrectly, that the drawbacks of such a system as outweighing the advantages. For example, a seller may believe that such a system forces undue competition among sellers for customers that submit offers. For example, if the seller does not accept a reasonable offer, another seller probably will. In fact, the seller may feel compelled to accept unusually low offer prices out of fear that another seller may gain the repeat business of the customer. Although some sellers may have, in fact, incorrectly assessed the magnitude of such drawbacks, the perception alone can prevent the sellers from participating in such a system.

Accordingly, it would be advantageous to provide a method and apparatus for processing conditional purchase offers in a manner that reduced the concerns of sellers.

SUMMARY OF THE INVENTION

It is an object of the present invention to provide a method and apparatus for processing conditional purchase offers in a manner that reduced the concerns of sellers.

In accordance with the present invention, a seller server receives an offer which specifies a type of product (e.g. a seat on a flight), at least one condition (e.g. destination and date of departure), and an offer price specified by a buyer. The seller server also receives an associated payment identifier that specifies a financial account, such as a credit card account. The payment identifier essentially "guarantees" the offer in that the seller may receive payment from the financial account even if the buyer attempts to renege. The seller determines whether to accept the offer, based on various factors such as the offer price and the availability of appropriate products to satisfy the conditions of the offer. If the offer is accepted, payment is provided to the seller using the payment identifier. The seller does not compete with other sellers for the received offers.

BRIEF DESCRIPTION OF THE DRAWINGS

FIG. 3 is a representation of a buyer database of the seller server of FIG. 2.

FIG. 4 is a representation of an inventory database of the seller server of FIG. 2.

FIG. 5 is a representation of an offer database of the seller server of FIG. 2.

FIG. 6 is a representation of a collected demand database of the seller server of FIG. 2.

DETAILED DESCRIPTION OF THE PREFERRED EMBODIMENTS

Applicants have recognized that sellers may prefer to work separately from other sellers in receiving offers from buyers. Furthermore, a single seller may be able to provide its buyers with more flexibility in accepting their offers. Such flexibility would benefit the buyers as well as the seller.

The seller may benefit or believe it can benefit from the absence of other parties, such as a central controller operated by a third party. Accordingly, the seller may prefer to receive offers directly from buyers. In such an embodiment, the seller may be able to circumvent certain transaction costs that would be paid to other parties.

As described in the parent applications of the present application, the seller may derive significant benefit from receiving such offers from buyers. For example, the seller may use revenue management techniques to determine whether it would be beneficial to accept a particular offer. The seller may also employ revenue management techniques in selecting products to fulfill the offers. In addition, conventional (e.g. retail) sales of products at retail prices are unaffected by the acceptance of such offers since accepted offer prices are not generally known to the public. Thus, the seller may sell at prices below retail prices, thereby deriving additional revenue, without starting a "price war" in which competing sellers lower their prices. Similarly, sellers may have a "reserve" of demand that may be accessed to supplement retail demand.

As described herein, one seller may receive offers directly from buyers, or the one seller may employ a central server that receives offers for a plurality of sellers and forwards any given offer to one appropriate seller.

Figure 1A:
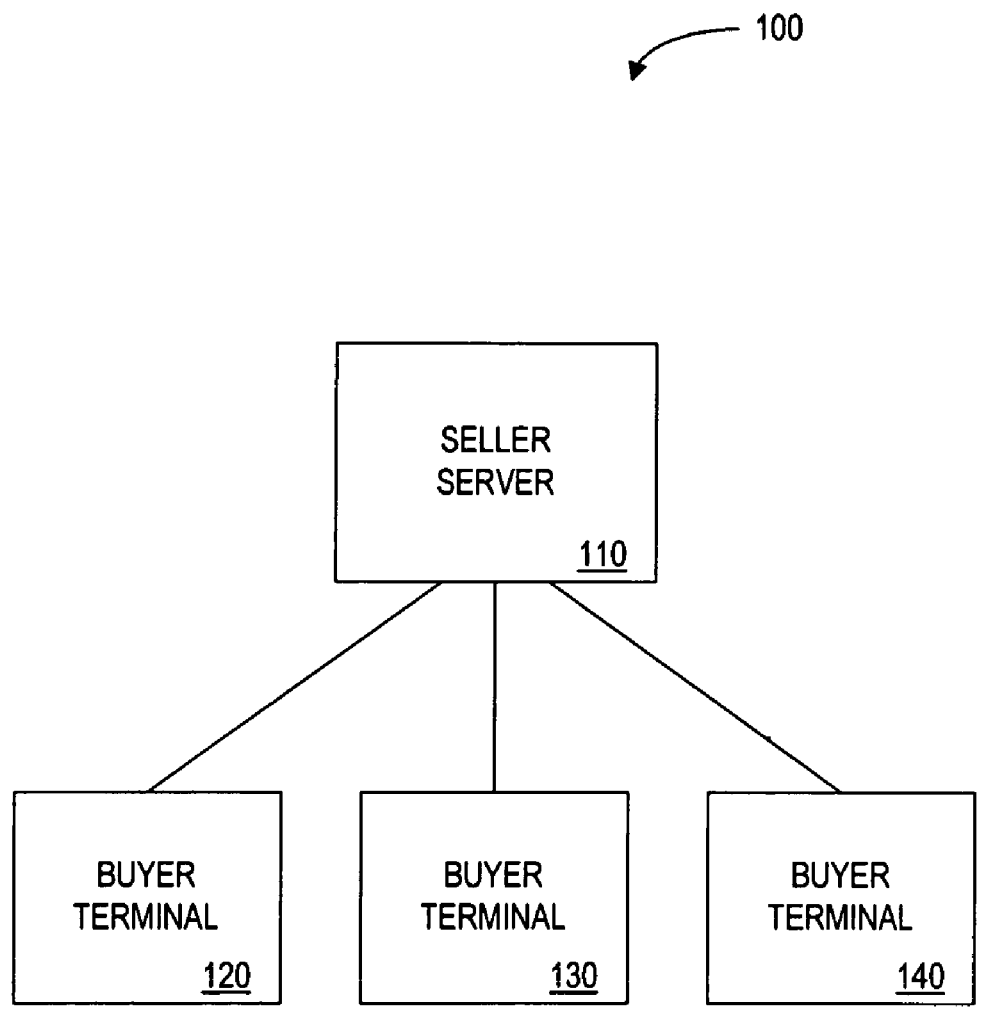
FIG. 1A is a schematic illustration of an apparatus for facilitating transactions between buyers and sellers.

Referring to FIG. 1A, an apparatus 100 includes a seller server 110 that is in communication with buyer terminals 120, 130 and 140. The seller server 110 may communicate with the buyer terminals 120, 130 and 140 via an appropriate network such as the Internet. Each of the seller server 110 and the buyer terminals 120, 130 and 140 may comprise computers, such as those based on the Intel® Pentium® microprocessor, that are adapted to communicate via the Internet (e.g. via a modem). Any number of buyer terminals may be in communication with the seller server 110.

The seller server 110 may be a "web server" of a seller. The seller server 110 can generate a web page that may be accessed via the World Wide Web and allow offers to be submitted to the seller. A buyer terminal may appropriately access the web page to communicate with the seller server 110 in a manner known to those skilled in the art.

Figure 1B:
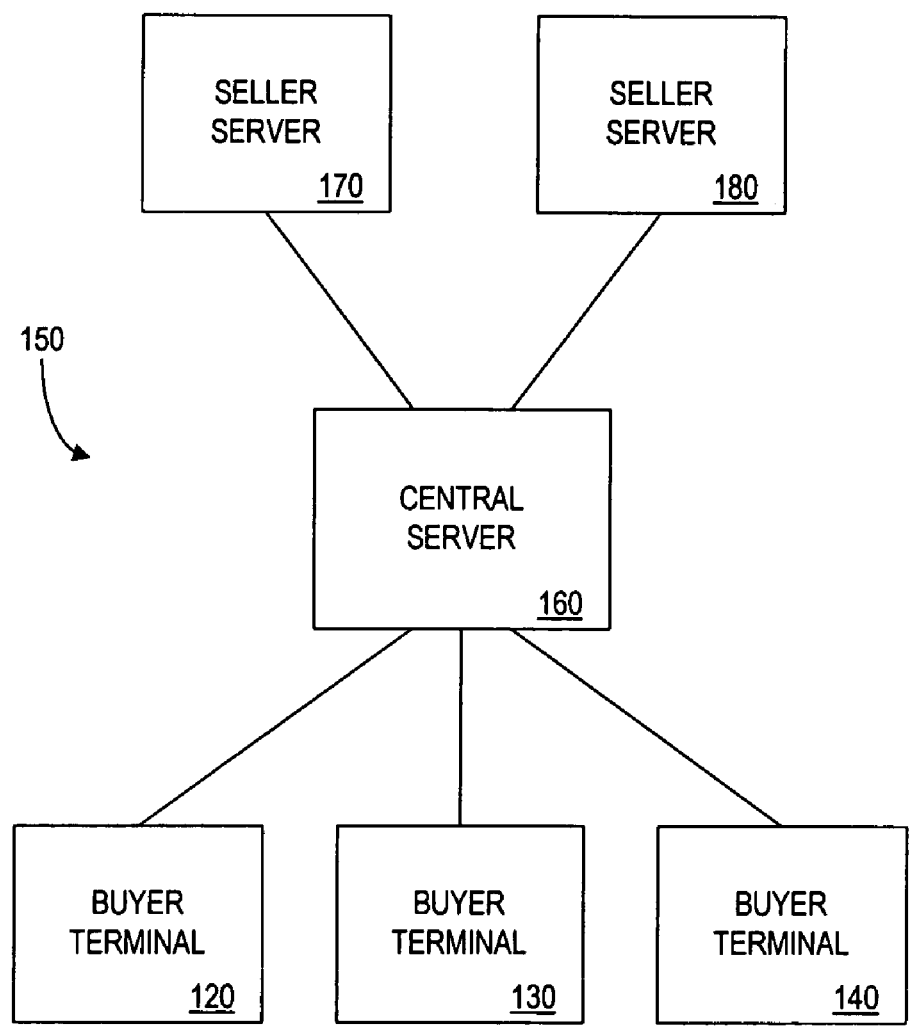
FIG. 1B is a schematic illustration of another embodiment of an apparatus for facilitating transactions between buyers and sellers.

FIG. 1B illustrates another embodiment of an apparatus for facilitating transactions between buyers and sellers. An apparatus 150 includes a central server 160 that is in communication with buyer terminals 120, 130 and 140. The central server 160 is also in communication with seller servers 170 and 180. Each seller server may be similar to the seller server 110 of FIG. 1A. A buyer may communicate with the central server 160 to submit an offer to a seller, and the central server 160 would in turn transmit the offer to one appropriate seller server. Each of the seller servers 170 and 180 may generate a web page that may be accessed via the World Wide Web and allow offers to be submitted to the corresponding seller. The central server 160 could then display the web page. Alternatively, the central server 160 may generate an appropriate web page that allows a seller to be selected by a buyer.

The central server 160 may communicate with the buyer terminals 120, 130 and 140 and with the seller servers 170 and 180 via an appropriate network such as the Internet. Each of the central server 160, the buyer terminals 120, 130 and 140 and the seller servers 170 and 180 may comprise computers, such as those based on the Intel® Pentium® microprocessor, that are adapted to communicate via the Internet (e.g. via a modem). Any number of buyer terminals and seller servers may be in communication with the central server 160.

Figure 2:
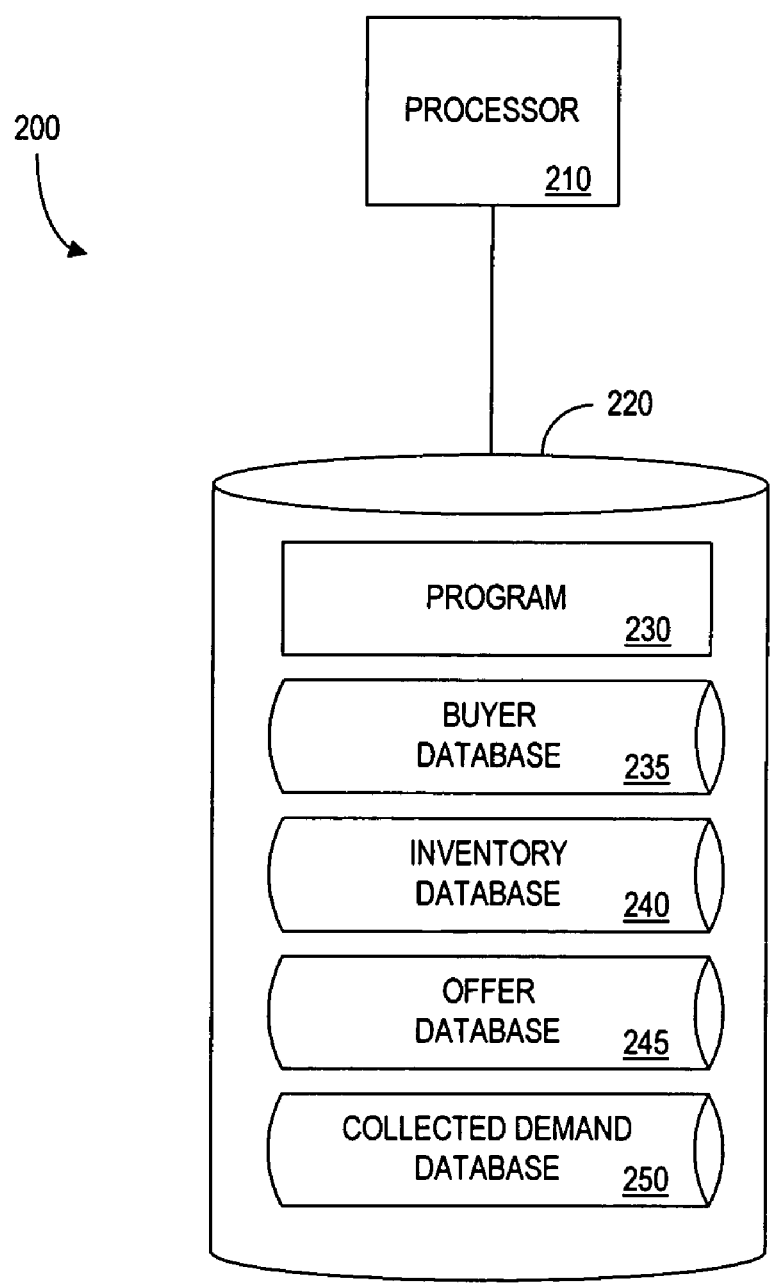
FIG. 2 is a schematic illustration of a seller server of the apparatus of FIGS. 1A and 1B.

Referring to FIG. 2, a seller server 200 is representative of the seller server 110 of FIG. 1A and the seller servers 170 and 180 of FIG. 1B. The seller server 200 comprises a processor 210, such as the Intel® Pentium® microprocessor. The processor 210 is in communication with a data storage device 220, such as an appropriate combination of magnetic, optical and/or semiconductor memory. For example, the data storage device 220 may comprise one or more of a ROM, RAM and hard disk. The processor 210 and the data storage device 220 may each be (i) located entirely within a single computer or other computing device; (ii) connected to each other by a remote communication medium, such as a serial port cable, telephone line or radio frequency transceiver; or (iii) a combination thereof. In one embodiment, the seller server 200 may comprise one or more computers that are connected to a remote server computer for maintaining databases.

The data storage device 220 stores a program 230 for controlling the processor 210. The processor 210 performs instructions of the program 230, and thereby operates in accordance with the present invention, and particularly in accordance with the methods described in detail herein. The program 230 furthermore includes program elements that may be necessary, such as an operating system and "device drivers" for allowing the processor 210 to interface with computer peripheral devices. Appropriate device drivers and other necessary program elements are known to those skilled in the art, and need not be described in detail herein.

The storage device 220 also stores (i) a buyer database 235, (ii) an inventory database 240, (iii) an offer database 245, and (iv) a collected demand database 250. The databases 235, 240, 245 and 250 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information, and those skilled in the art will understand that the number and content of the entries can be different from those illustrated herein.

Referring to FIG. 3, a table 300 represents an embodiment of the buyer database 235 (FIG. 2). The table 300 includes entries 302 and 304, each defining a buyer that submits one or more offers directly or indirectly to one seller server of a seller. Those skilled in the art will understand that that the table 300 may include any number of entries. The table 300 also defines fields for each of the entries 302 and 304. The fields specify (i) a buyer identifier 320 that uniquely identifies the buyer, (ii) a name 322 of the buyer, (iii) an electronic mail ("email") address 324 for communication with the buyer, (iv) an address 326 of the buyer, (v) a day telephone number 328, (vi) an evening telephone number 330, and (vii) a payment identifier 332 that specifies a financial account that the buyer may use to render payment.

Referring to FIG. 4, a table 400 represents an embodiment of the inventory database 240 (FIG. 2). The table 400 includes entries 402, 404 and 406, each defining a product that a seller offers for sale. In the embodiment illustrated in FIG. 4, the inventory database 240 includes seats on flights, and accordingly the seller is a seller of airline tickets. Those skilled in the art will understand that that the table 400 may include any number of entries. The table 400 also defines fields for each of the entries 402, 404 and 406. The fields specify (i) a flight number 420 that uniquely identifies the flight, (ii) a date 422 of the flight, (iii) an origination airport 424, (iv) a destination airport 426, (v) a time 428 of departure of the flight, (vi) a time 430 of arrival of the flight, (vii) a number of coach seats available 432 on the flight, and (viii) a number of business seats available 434 on the flight.

Referring to FIG. 5, a table 500 represents an embodiment of the offer database 245 (FIG. 2). The table 500 includes entries 502 and 504, each defining an offer that a buyer has submitted to the seller. In the embodiment illustrated in FIG. 5, the offer database includes offers for seats on flights, and accordingly the seller is a seller of airline tickets. Those skilled in the art will understand that that the table 500 may include any number of entries. The table 500 also defines fields for each of the entries 502 and 504. The fields specify (i) an offer identifier 520 that uniquely identifies the offer, (ii) a buyer identifier that uniquely identifies the buyer that submitted the offer, (iii) a payment identifier 524 that specifies a financial account that the buyer may use to render payment, (iv) an offer price 526 that the buyer specifies, (v) offer conditions 528 that a product must satisfy to be acceptable to the buyer (e.g. a destination, an expiration of the offer), (vi) whether the offer was accepted 530, and (vii) one or more product purchased 532 if the seller accepts the offer.

Referring to FIG. 6, a table 600 represents an embodiment of the collected demand database 250 (FIG. 2). The table 600 includes entries 602, 604 and 606, each defining demand received for a type of product. Demand for a type of product is measured based on the offers that are received for that type of product. In the embodiment illustrated in FIG. 6, the type of product is a seat on a flight. To contrast, a product would be one or more seats on a specific flight on a particular date from a particular origination airport and to a particular destination airport.

Those skilled in the art will understand that that the table 600 may include any number of entries. The table 600 also defines fields for each of the entries 602, 604 and 606.

The fields specify (i) an origination 620, which is typically defined as a city and a state; (ii) a destination 622, which is typically defined as a city and a state; (iii) a departure date 624; (iv) an offer price 626 that was submitted; (v) the number of units of demand 630 that were received, which is typically the aggregation of the number of tickets requested for each offer; and (vi) a status 632 of the demand, in particular whether the offers composing the demand were accepted.

The fields such as origination 620, destination 622 and departure date 624 define conditions that a product must satisfy. Other conditions besides those illustrated may be defined for seats on flights, as well as for other types of products.

Figure 7:
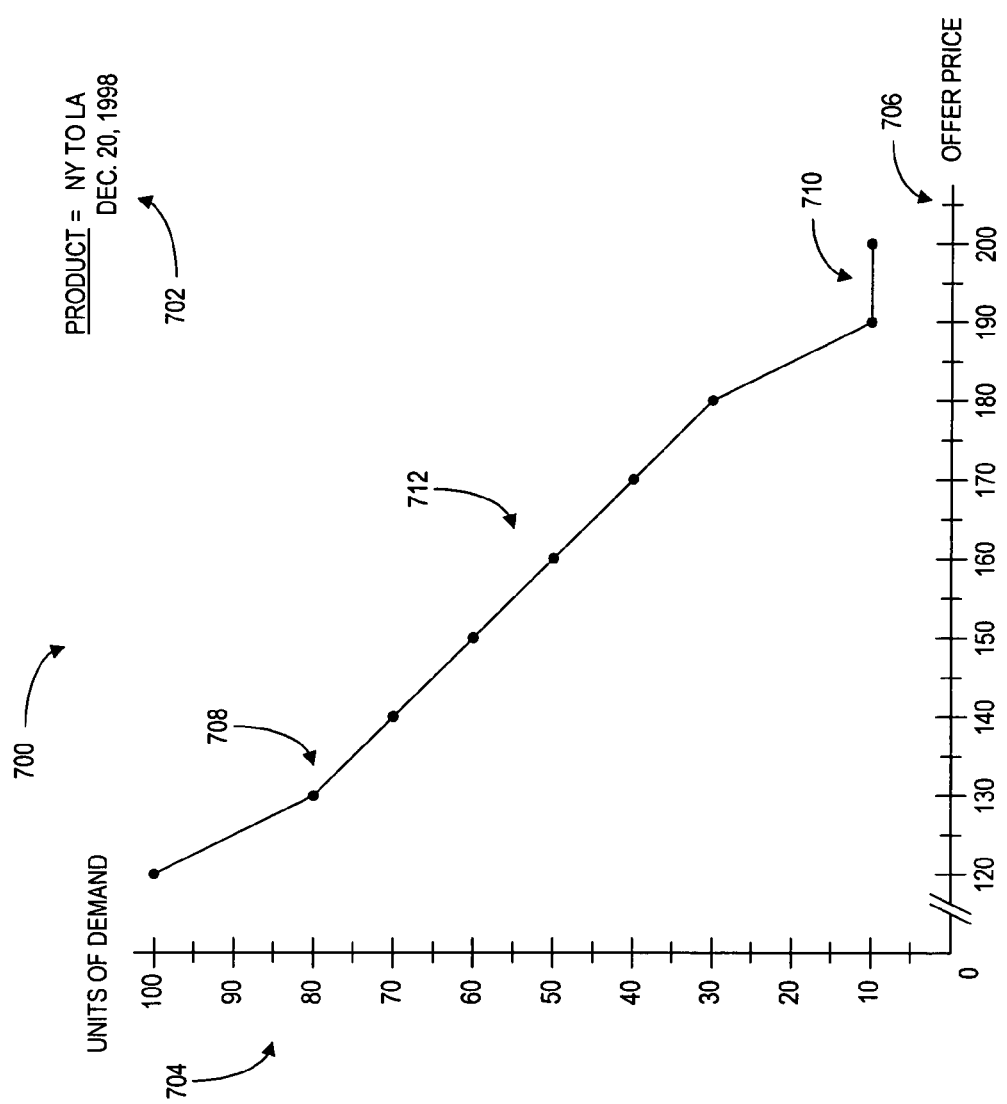
FIG. 7 is a graph representing demand collected for a specific type of product having certain conditions.

Referring to FIG. 7, a graph 700 represents illustrative demand collected for a specific type of product having certain conditions. The graph 700 is depicted to illustrate various uses of the data the graph represents. As indicated by text 702, the graph 700 represents demand collected for seats on a flight from New York to Los Angeles on Dec. 20, 1998. The graph 700 may be generated based on offers received from buyers. For example, the graph 700 would be based on received offers that included or were consistent with the conditions represented by the graph 700. Those skilled in the art will understand that similar graphs may be generated for various types of products having various conditions. For example, a graph could be generated to represent offers for seats on a flight from New York to Los Angeles. Alternatively, a graph could be generated to represent offers for seats on a flight from New York to Los Angeles anytime between Dec. 15, 1998 and Dec. 25, 1998.

The graph 700 includes a vertical axis 704 to indicate units of demand and a horizontal axis 706 to indicate offer prices. Each point on the graph thus indicates a quantity of offers having a specified offer price. For example, a point 708 indicates that there was demand for eighty seats at an offer price of $130. Such demand may have been derived from, for example, eighty offers for one seat each (80×1=80), or forty offers for two seats each (40×2=80). A point 710 indicates that there was demand for ten seats at an offer price of $200. Such demand may have been derived from, for example, ten offers for one seat each (10×1=10), or two offers for five seats each (2×5=10). A curve 712 indicates demand for the various points of the graph 700, and may represent extrapolated demand at other points.

Figure 8A:
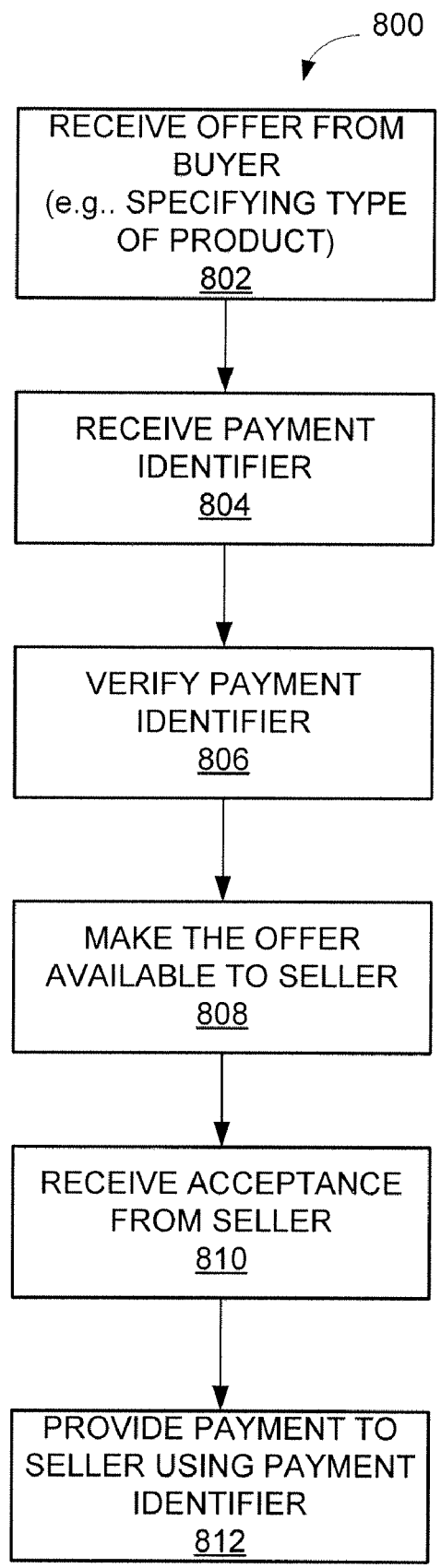
FIG. 8A is a flow chart illustrating an embodiment of a method for facilitating a transaction between a buyer and one seller.

Referring to FIG. 8A, a flow chart 800 illustrates an embodiment of a method for facilitating a transaction between a buyer and one seller. In particular, in the illustrated embodiment a buyer device communicates via a central server to provide offers to one of a plurality of seller servers, as illustrated by the apparatus 150 of FIG. 1B.

The central server receives an offer from a buyer (step 802). As described above, the offer specifies a type of product (e.g. a seat on a flight), at least one condition, and an offer price specified by the buyer. The offer may specify the type of product explicitly or implicitly. For example, on a web site where offer data is provided by the buyer, the buyer may click a button or hyperlink, or otherwise indicate the type of product. Alternatively, the buyer may specify the type of product by selecting the seller to which he would like to submit the offer.

In an embodiment in which the type of product is a seat on a flight, some possible conditions that the offer specifies are an origination, a destination, a date of departure and/or a time of departure. Conditions may specify singular values (e.g. time of departure=8:00 AM) or ranges of values (e.g. time of departure=after 8:00 AM).

The central server also receives a payment identifier that specifies a financial account (step 804). The payment identifier is associated with the offer such that if the offer is accepted the payment identifier may be used to render payment for the product purchased. In one embodiment, the offer includes the payment identifier. In another embodiment, the buyer submits the payment identifier after submitting the offer. In still another embodiment, the buyer submits the payment identifier prior to submitting the offer. For example, the buyer may submit the payment identifier during a registration process, if registration is required by the central server. The payment identifier may be stored in the buyer database 235 (FIG. 2) and available whenever it is necessary for payment to be received from the buyer. In such an embodiment, the buyer could submit his payment identifier once and subsequently have that payment identifier used to render payment for numerous offers.

In one embodiment, the financial account is a credit card account, and thus the payment identifier may be a credit card number that specifies the credit card account. In other embodiments, the payment identifier may specify debit card accounts, savings or checking accounts, or electronic cash. Those skilled in the art will understand that the payment identifier may specify other types of financial accounts and currencies.

The payment identifier is verified (step 806). For example, it may be verified whether the financial account exists and/or whether the financial account has sufficient funds to pay the offer price. In addition, funds in the financial account may be "frozen" to assure that they are available.

The offer price may define one or more forms of currency. For example, the offer price may be a dollar amount (e.g. $200). The offer price may alternatively define a first amount of a first form of currency, and a second amount of a second form of currency. For example, one form of currency can be frequent flyer miles that the buyer desires to use, and thus one exemplary offer price could be "$100 and 10,000 frequent flyer miles".

In such an embodiment, the payment identifier may specify one or more financial accounts for paying the various forms of currency. For example, a single payment identifier such as a credit card number may specify both (i) a credit line which may be used to charge various dollar amounts, and (ii) a number of frequent flyer miles associated with the credit card account. Alternatively, two or more payment identifiers (e.g. a credit card number and a frequent flyer identifier) may be used to specify financial accounts, each of which could be debited in accordance with the offer price.

The offer is then made available to one seller (step 808). For example, the offer may be transmitted via email to a seller server, or the seller server may access a database where the central server stores the offer. The seller may be selected explicitly by the buyer. For example, the central server may provide a list of available sellers, and the buyer may in turn select one seller from the list. Alternatively, the seller may be selected based on the type of product specified by the offer. For example, if the offer specifies a seat on a flight and only one seller could fulfill such an offer (e.g. the only airline to provide such a flight), then that seller would be selected.

In response to the offer, the seller may accept the offer, and the central server receives the acceptance from the seller server (step 810). Payment is then provided to the seller using the payment identifier (step 812). In one embodiment, the central server uses the payment identifier to debit the offer price from the financial account, and payment is provided to a seller account. In another embodiment, the payment identifier may be provided to the seller, allowing the seller to directly debit the financial account. Those skilled in the art will realize other methods of rendering payment to the seller in accordance with the present invention.

The payment rendered to the seller is typically the offer price specified by the offer. In addition, transaction fee may be rendered to the central server or other party. For example, a "flat fee" (e.g. $5 per offer) or a commission (e.g. 1% of the offer price) may be charged to the buyer in addition to the offer price.

The payment identifier essentially "guarantees" payment to the seller, and thus the seller is more willing to expend resources to review and accept such offers. Even if the buyer reneges or attempts to renege (e.g. if the buyer indicates withdrawal of the offer after it was accepted), the full payment (e.g. the offer price) may still be rendered in accordance with a pre-existing contract between buyer and seller. Alternatively, if the buyer reneges or attempts to renege, a penalty payment amount may be charged to the financial account. Such a penalty amount may be, for example, a flat fee (e.g. $25) or a predetermined percentage of the offer price (e.g. 10% of the offer price). Accordingly, in one embodiment it may be desirable to request that the buyer provide authorization to use the payment identifier to provide payment upon acceptance of the offer. Acceptance could be delayed until such authorization is received from the buyer.

Figure 8B:
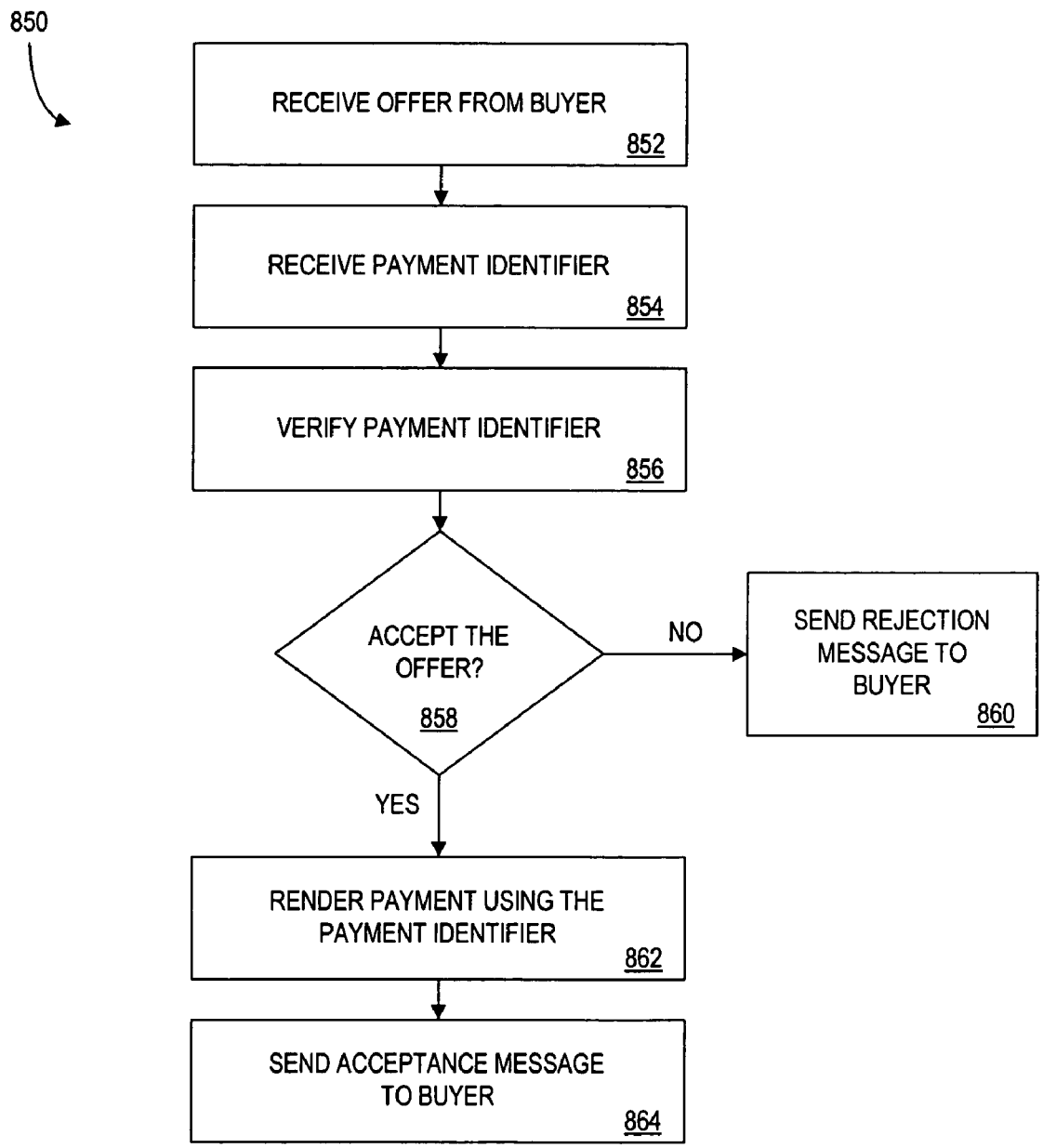
FIG. 8B is a flow chart illustrating another embodiment of a method for facilitating a transaction between a buyer and one seller.

Referring to FIG. 8B, a flow chart 850 illustrates another embodiment of a method for facilitating a transaction between a buyer and one seller. In particular, in the illustrated embodiment a buyer device communicates directly with a seller server, as illustrated in FIG. 1A.

The seller server receives an offer from a buyer (step 852). As described above, the offer specifies a type of product (e.g. a seat on a flight), at least one condition, and an offer price specified by the buyer. The central server also receives an associated payment identifier that specifies a financial account (step 854), and the payment identifier is verified (step 856). The seller server then determines whether to accept the offer (step 858). Various methods may be used to determine whether to accept the offer, as described below. If the offer is not accepted, then the seller server sends an appropriate rejection message to the buyer (step 860). Otherwise, payment is rendered to the seller by using the payment identifier (step 862) and an appropriate acceptance message is sent to the buyer (step 864).

Figure 9:
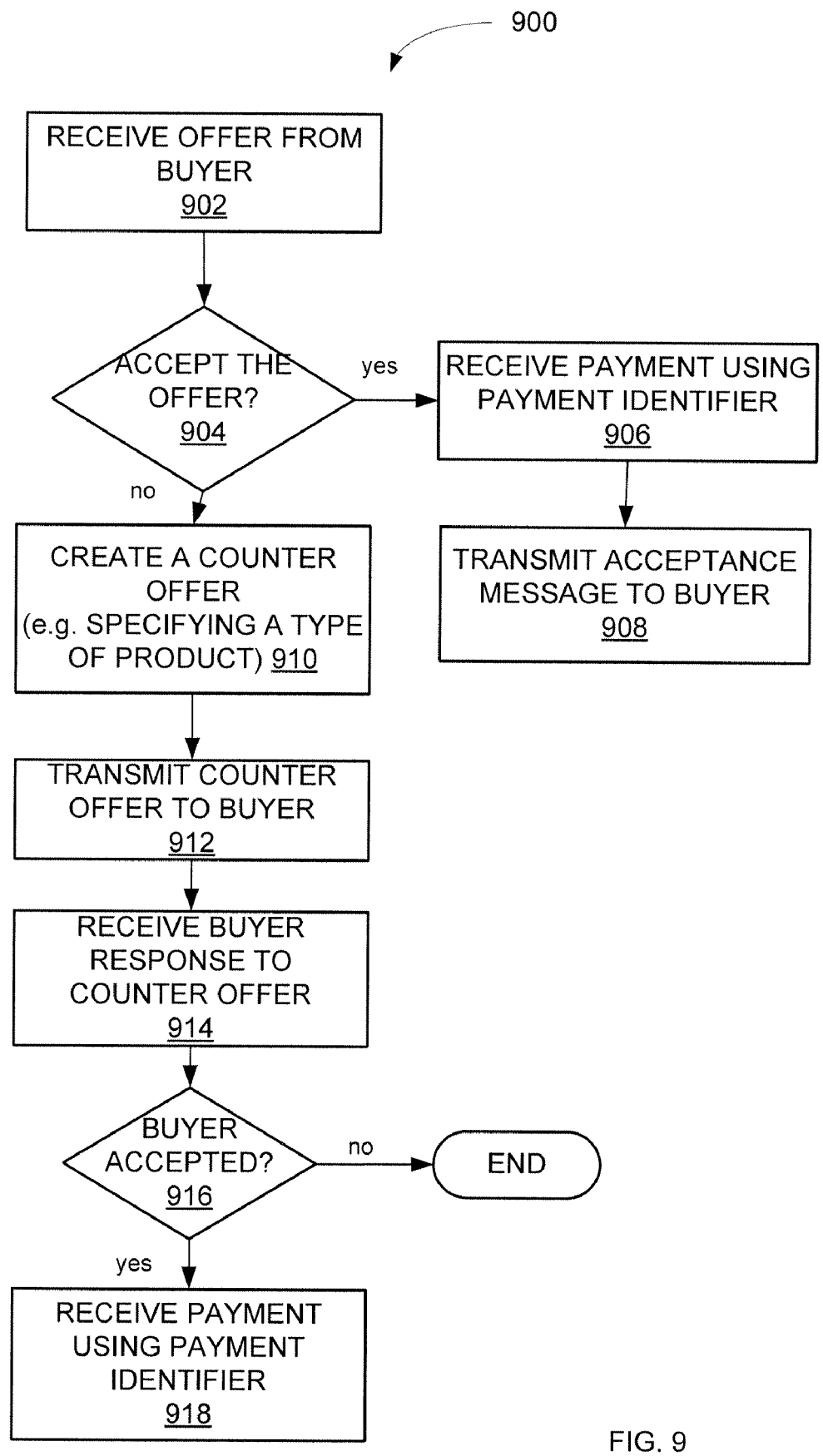
FIG. 9 is a flow chart illustrating a method for facilitating a transaction between a buyer and one seller using a counter offer from the seller.

Referring to FIG. 9, a flow chart 900 illustrates a method for facilitating a transaction between a buyer and one seller using a counter offer from the seller. As described above, an offer from a buyer is received (step 902) and the seller server determines whether the offer should be accepted (step 904). If so, then as also described above payment is rendered (step 906) and an appropriate acceptance message is transmitted to the buyer (step 908).

If the offer is not accepted by the seller, then the seller server may create a counter offer that specifies the type of product and a counter offer price (step 910). The counter offer price may be based on the offer price. For example, the counter offer price may be a predetermined amount less than the offer price to provide the customer with an incentive to accept. The counter offer may indicate a specific product (e.g. seat 112 on flight 1135 on Dec. 20, 1998). Alternatively, the counter offer may specify conditions (e.g. a flight on Dec. 20, 1998 from New York to Los Angeles) without indicating a specific product.

The counter offer is transmitted to the buyer (step 912), and then a response from the buyer is received (step 914). If the response indicates that the buyer accepted the counter offer (step 916), then payment is rendered using the payment identifier (step 918).

Figure 10:
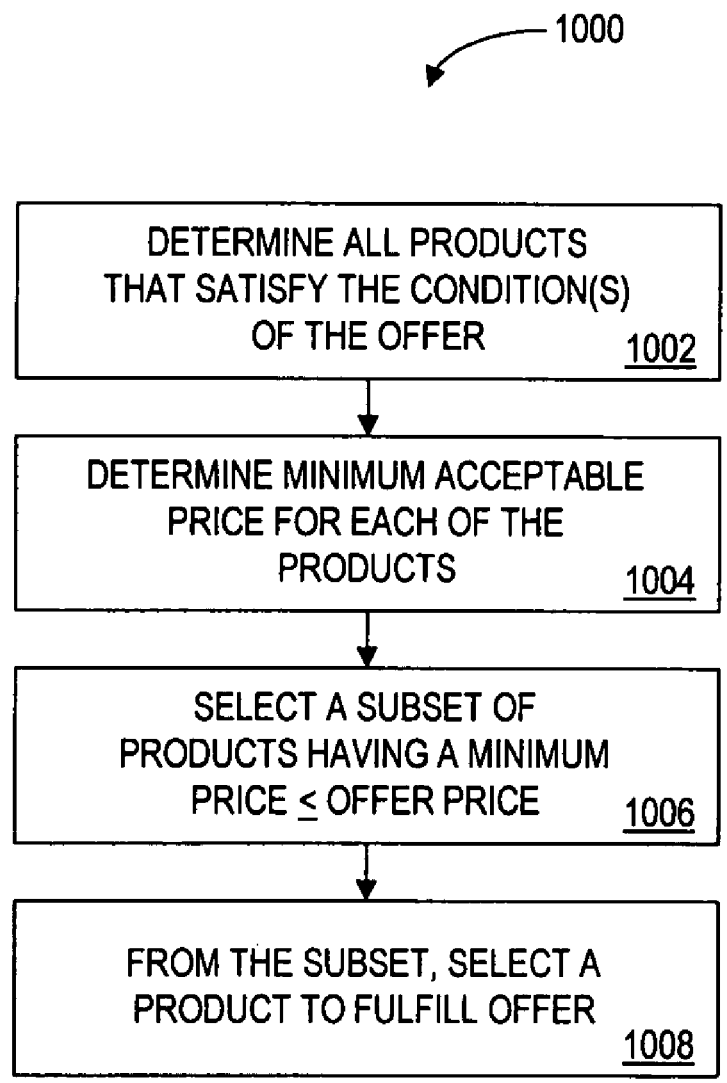
FIG. 10 is a flow chart illustrating a method for selecting a product to fulfill an offer.

Referring to FIG. 10, a flow chart 1000 illustrates a method for selecting a product to fulfill an offer. The seller server determines all products that satisfy the conditions of the offer (step 1002). For example, if the offer is for a seat on a flight, and the offer specifies an origination, a destination and a date of departure, the seller server would determine all available seats on flights that depart on the specified date of departure from the origination to the destination. Additionally, only certain products may be eligible to be used to fulfill an offer. For example, only certain products may be "allocated" for fulfilling offers. Accordingly, the remaining products may be reserved for conventional (retail) sales.

The seller server then determines a minimum acceptable price for each of these products (step 1004). The minimum price, which is typically lower than the retail price of the product, may be based on any of a number of factors. In one embodiment, the seller server may determine the minimum price of a product based on the availability of the product. For example, if many units of a particular product are unsold (e.g. many seats on a particular flight), then the minimum price may be lower than if fewer seats were unsold. In another embodiment, the seller server may determine the minimum price of a product based on a comparison of predicted sales of the product and actual sales of the product. For example, if the actual sales of the product are less than predicted sales of the product (e.g. ten seats on a flight are sold at a certain time when it was anticipated that twenty seats would be sold), then the minimum price may be lower than if fewer seats were unsold. In still another embodiment, the seller server may determine the minimum price of a product based on the expected profit from the product. A combination of factors may be used in determining the minimum price of a product, and those skilled in the art will realize various other factors for determining the minimum acceptable price of a product.

The seller server then selects a subset of products in which each product in the subset has a minimum price less than or equal to the offer price (step 1006). Such a subset thus defines the products that are acceptable to fulfill the offer. If the subset includes more than one product, then a product is selected from the subset and the selected product is used to fulfill the offer (step 1008). The step 1008 of selecting a product from the subset may be based on any of a number of factors. For example, the product may be selected based on (i) expected profit from the product, (ii) the availability of the product, (iii) a comparison of predicted sales of the product and actual sales of the product, and (iv) whether actual sales of the product are less than predicted sales of the product. To illustrate, the seller server may determine, for each product, an amount by which actual sales of the product are less than predicted sales of the product. Then, the seller server could select the product that has the maximal amount by which actual sales of the product are less than predicted sales of the product.

It can be advantageous to perform "load balancing" in determining which product is selected to fulfill an offer. For example, if seats on either of two similar flights would satisfy the conditions of an offer, it can be advantageous to use a seat on the emptier flight to fulfill the offer. Otherwise, one flight would have a much greater number of unsold seats.

Accordingly, in another embodiment the step 1008 of selecting a product from the subset may comprise determining whether sales of a first set of products (e.g. seats on the first flight) are less than sales of a second set of products (e.g. seats on the second flight). If sales of the first set are less than sales of the second set, then a product from the first set is selected to fulfill the offer.

It can also be advantageous to allow the buyer to choose which product he would like to fulfill his offer. Accordingly, in another embodiment the step 1008 of selecting a product from the subset may comprise transmitting an indication of the subset of products to the buyer, and then receiving from the buyer a selection of one of the plurality of products.

Figure 11:
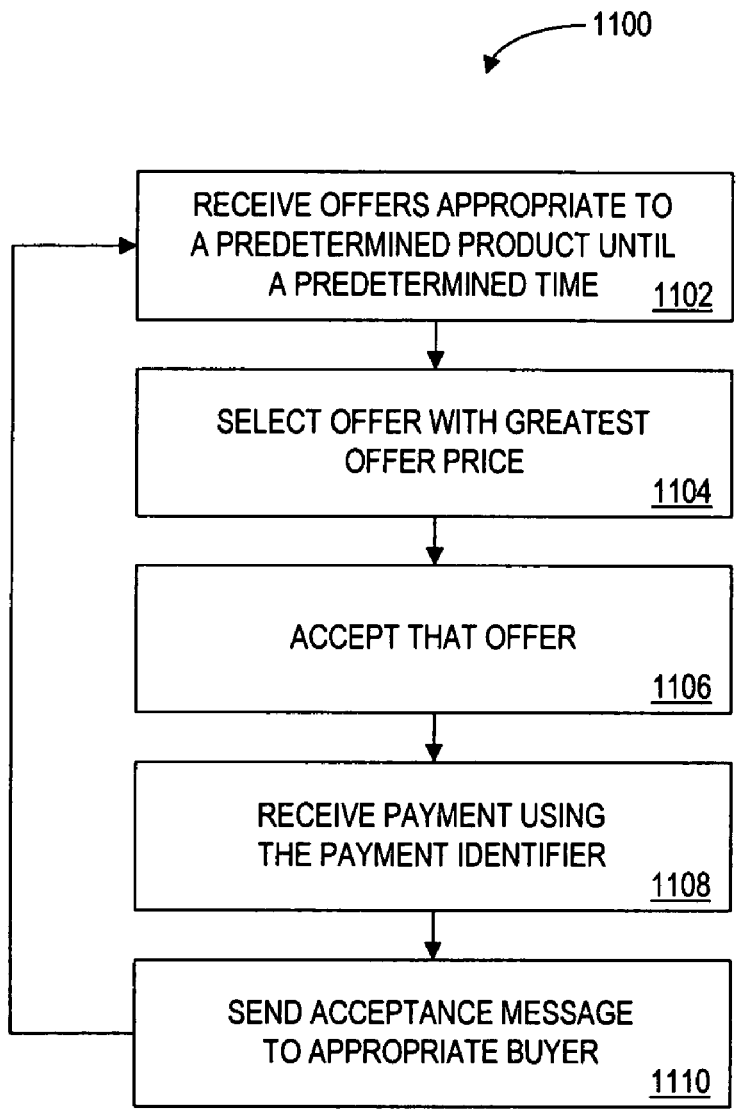
FIG. 11 is a flow chart illustrating a method for accepting offers.

Referring to FIG. 11, a flow chart 1100 illustrates a method for accepting offers. In particular, in the illustrated method acceptance of an offer is delayed to allow competitive offers to be received. Thus, the seller may gain by not prematurely accepting an offer when a better offer may be subsequently received.

The seller server receives offers appropriate to a predetermined product until a predetermined time (step 1002), and does not accept offers until that time. For example, the seller server may delay until end of the day, or until a predetermined number of offers are received. After the predetermined time is reached, the offer having the greatest offer price is selected (step 1104) and the selected offer is accepted (step 1106). Then as described above, payment is received using the payment identifier (step 1108) and an acceptance message is sent to the appropriate buyer that submitted the selected offer (step 1110). The method may then continue at step 1102 with more offers being received. Any offers that were received but not accepted may be stored and possibly evaluated during the next cycle. For example, if in a first cycle one hundred offers are received, and only one offer is accepted, then in a second cycle another hundred offers may be received. Thus, in the second cycle there are one hundred and ninety nine offers to evaluate, and the offer having the highest offer price may be accepted.

It can be desirable to prevent the minimum acceptable price of a product from being disclosed. For example, competitors of a seller could take advantage of the minimum acceptable price by adjusting their prices accordingly. In addition, if buyers knew the minimum acceptable price of a product they would have no incentive to submit offer prices greater than the minimum acceptable price, even if they would otherwise be willing to do so.

Figure 12:
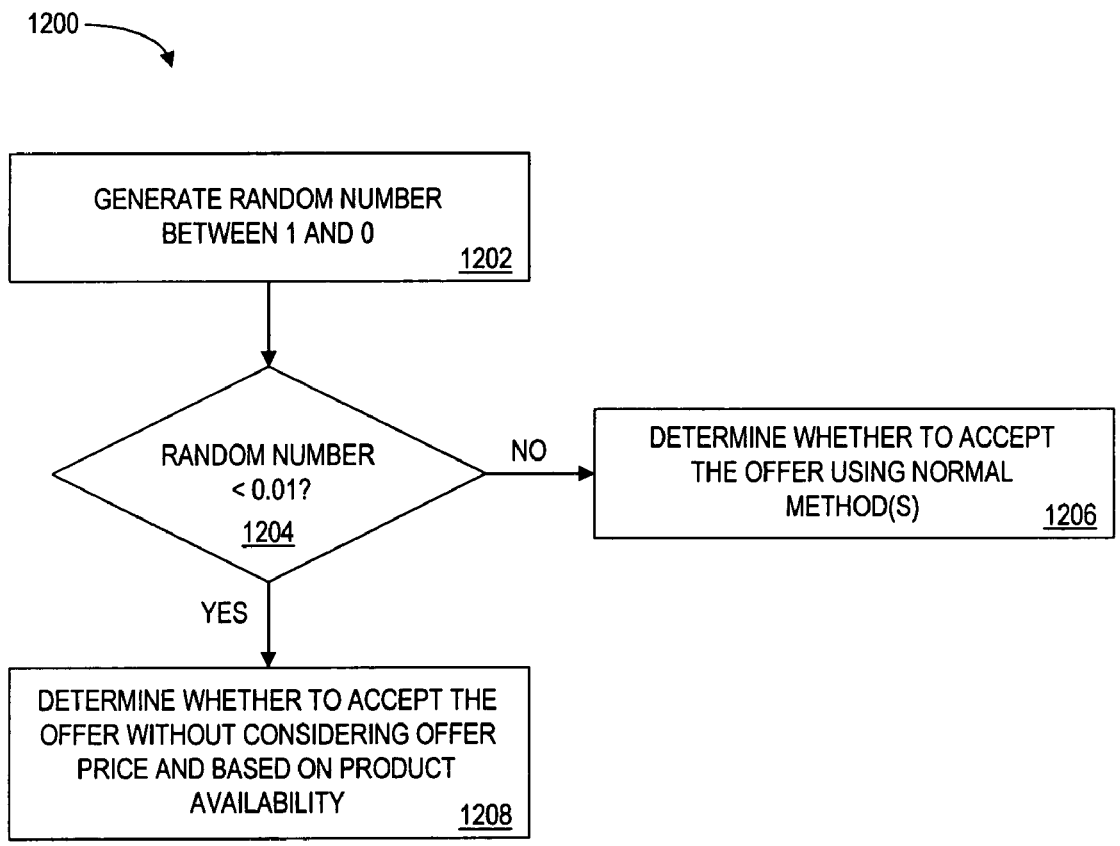
FIG. 12 is a flow chart illustrating a method for concealing a minimum acceptable price of a product.

Referring to FIG. 12, a flow chart 1200 illustrates a method for concealing a minimum acceptable price of a product. The illustrated method may performed, for example, for each offer received.

The seller server generates a random number between zero and one (step 1202) in a manner known in the art. If the random number is not less than 0.01 (step 1204), then the seller server determines whether to accept the offer using the normal methods of the present invention described herein (step 1206). Thus, the normal methods are applied approximately ninety nine percent of the time (1−0.01=0.99=99%). Those skilled in the art will realize that the probability of performing the normal methods may be altered as desired, as may the method of randomly selecting when to perform the normal methods.

If the random number is in the range from 0.00 to 0.01, then the seller server determines whether to accept the offer without considering the offer price (step 1208). In one embodiment, the determination of whether to accept the offer may be based solely on product availability. For example, if a product exists which may satisfy the offer, then the offer may be accepted regardless of the offer price.

In the illustrated embodiment, since approximately one percent of all offers are accepted based solely on product availability or based on other criteria besides the offer price, offers having extremely small offer prices may still be accepted. Accordingly, it would be difficult to ascertain the minimum acceptable price of the product. In addition, since such offers may be accepted relatively rarely, the loss to the seller of selling below its minimum acceptable price is likely to be insignificant.

As described above, the present invention can allow a seller to accurately assess the demand for various products since submitted offers are "guaranteed" by some form of payment and thus are unlikely to be impulsive or capricious. Consequently, the seller may use the demand assessment to its advantage in such tasks as setting the prices of products and setting the future supplies of products.

Figure 13:
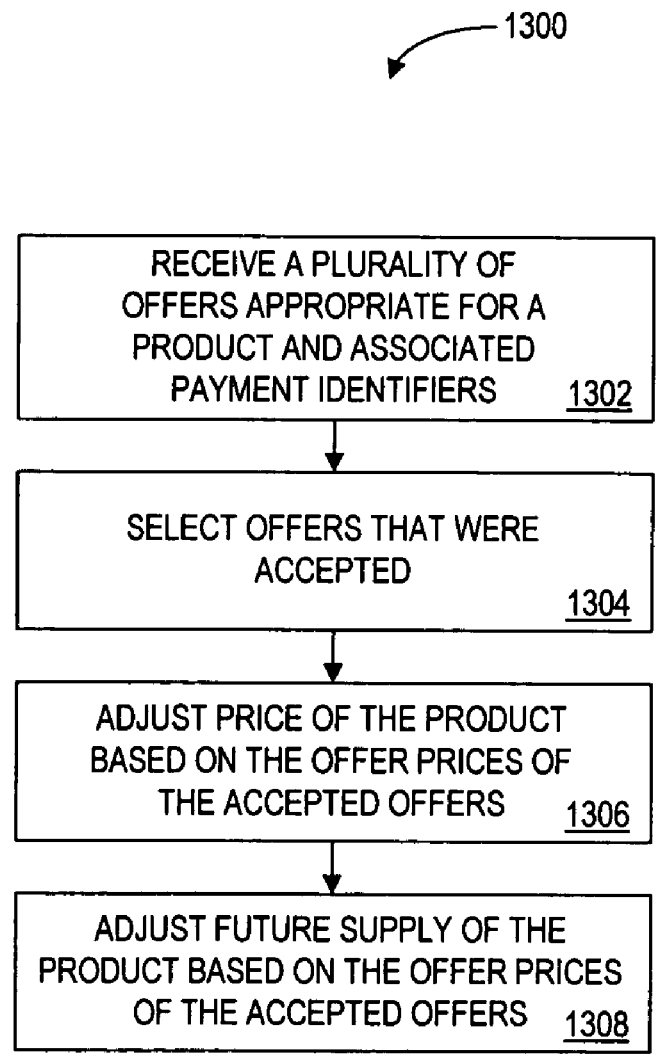
FIG. 13 is a flow chart illustrating a method for assessing demand for a product.

Referring to FIG. 13, a flow chart 1300 illustrates a method for assessing demand for a product. As described above, the seller server receives a plurality of offers that are appropriate for a product, as well as associated payment identifiers (step 1302). An offer is appropriate for the product if the product satisfies each condition of the offer. Offers that are appropriate for other products are evaluated in a similar manner for the other products.

The seller server selects offers that were accepted or that are likely to be accepted (step 1304). Accepted offers may be advantageously used to assess true demand which is also acceptable to the seller (i.e. demand that does not include unreasonably small offer prices). Data from the plurality of offers, or just the accepted offers, are stored, such as in the collected demand database 250 (FIG. 2). The stored data may be used in generating graphs, such as the graph 700 (FIG. 7), to represent the associated demand.

The (future or current) price, which may be the retail price and/or the minimum acceptable price, of the product is adjusted based on the offer prices of the accepted offers (step 1306). For example, if the offer prices indicate great demand and/or great willingness to pay large offer prices for the product, the price of the product may be increased. Similarly, the future supply of the product is adjusted based on the offer prices of the accepted offers (step 1308). For example, if the offer prices indicate great demand and/or great willingness to pay large offer prices for the product, the seller may take steps to increase the supply of the product, such as increasing manufacturing or otherwise making more units of the product available for sale.

In another embodiment, all demand, whether accepted or not, may be used in making the above-described adjustments. Similarly, the seller server may base its adjustments on data from the plurality of offers besides offer prices, such as when the offers were submitted and the number of offers submitted. Those skilled in the art will understand that the present invention contemplates many types of data from offers may be used to adjust prices and supplies of products.

Although the present invention has been described with respect to a preferred embodiment thereof, those skilled in the art will note that various substitutions may be made to those embodiments described herein without departing from the spirit and scope of the present invention. For example, many methods described above as being performed by the seller server may be performed by the central server if desired. Furthermore, much of the invention and associated advantages disclosed herein can be equally applicable to an environment in which any given offer is submitted to more than one seller.

What is claimed is:

1. A method for facilitating a transaction between a buyer and one seller, the method comprising the steps of:
   receiving an offer which specifies a type of product or service, at least one condition, and an offer price specified by a buyer, wherein the type of product or service identified in the offer specifies a category of products or services for use by the seller to select a specific product or service to satisfy the offer's at least one condition;
   receiving a payment identifier specifying a financial account, the payment identifier being associated with the offer;
   making the offer available to one seller after receiving the payment identifier; receiving an acceptance from the one seller, the acceptance being responsive to the offer; and
   providing a payment to the one seller by using the payment identifier upon receiving the acceptance.

2. The method of claim 1, in which the step of providing a payment to the one seller comprises:
   providing a payment that is based on the offer price.

3. The method of claim 1, in which the step of providing a payment to the one seller comprises:
   providing a payment that is based a penalty payment amount if the buyer indicates withdrawal of the offer after the step of receiving an acceptance.

4. The method of claim 1, in which the offer price defines at least two forms of currency.

5. The method of claim 4, in which the offer price defines:
   a first amount of first form of currency, and
   a second amount of second form of currency.

6. The method of claim 4, in which at least one form of currency is frequent flyer miles.

7. The method of claim 4, in which the payment identifier specifies:
   a first financial account for paying a first form of currency, and a second financial account for paying a second form of currency.

8. The method of claim 7, in which the first financial account is the second financial account.

9. The method of claim 7, in which the step of providing payment comprises:
   debiting the first financial account and debiting the second financial account.

10. The method of claim 1, further comprising:
    selecting the one seller from a plurality of sellers based on the type of product.

11. The method of claim 1, in which the financial account is a credit card account.

12. A method for facilitating a transaction between a buyer and one seller, the method comprising the steps of:
    receiving an offer which specifies a type of product or service, at least one condition, and an offer price specified by a buyer, wherein the type of product or service identified in the offer specifies a category of products or services for use by the seller to select a specific product or service to satisfy the offer's at least one condition;
    receiving a payment identifier specifying a financial account, the payment identifier being associated with the offer;
    determining whether to accept the offer; and
    receiving payment by using the payment identifier upon determining to accept the offer.

13. The method of claim 12, in which the step of determining whether to accept the offer comprises:
    randomly determining whether to accept the offer without considering the offer price.

14. The method of claim 13, further comprising:
    determining whether to accept the offer based on product availability after the step of randomly determining to accept the offer without considering the offer price.

15. The method of claim 13, further comprising:
    generating a random number; and
    determining, if the random number is within a predetermined range, whether to accept the offer based on product availability without considering the offer price.

16. The method of claim 12, further comprising:
    creating a counter offer upon determining to reject the offer, the counter offer specifying the type of product, and a counter offer price; and
    transmitting the counter offer to the buyer.

17. The method of claim 16, in which the counter offer price is based on the offer price.

18. The method of claim 17, in which the counter offer price is less than the offer price.

19. The method of claim 12, further comprising:
    determining a plurality of products that satisfy the at least one condition.

20. The method of claim 19, further comprising:
    transmitting an indication of the plurality of products to the buyer.

21. The method of claim 20, further comprising:
    receiving from the buyer a selection of one of the plurality of products.

22. The method of claim 19, further comprising:
    selecting a product from the plurality of products to fulfill the offer.

23. The method of claim 22, in which the step of selecting comprises:
    selecting a product based on expected profit from the product.

24. The method of claim 22, in which the step of selecting comprises:
    selecting a product based on availability of the product.

25. The method of claim 22, in which the step of selecting comprises:
    selecting a product based on a comparison of predicted sales of the product and actual sales of the product.

26. The method of claim 22, in which the step of selecting comprises:
    selecting a product based on whether actual sales of the product are less than predicted sales of the product.

27. The method of claim 22, in which the step of selecting comprises:
    determining, for each product, an amount by which actual sales of the product are less than predicted sales of the product; and
    selecting a product that has a maximal amount by which actual sales of the product are less than predicted sales of the product.

28. The method of claim 22, in which the step of determining whether to accept the offer comprises:
    determining whether sales of a first set of products are less than sales of a second set of products; and
    selecting a product from the first set of products if sales of the first set are less than E sales of the second set.

29. The method of claim 28, in which each product of the plurality of products is allocated for fulfilling offers.

30. The method of claim 12, in which the step of determining whether to accept the offer comprises:
    determining whether to accept the offer based on an availability of a product.

31. The method of claim 12, in which the step of determining whether to accept the offer comprises:
    determining whether to accept the offer based on a comparison of predicted sales of a product and actual sales of the product.

32. The method of claim 31, in which the step of determining whether to accept the offer comprises:
    determining whether to accept the offer based on whether actual sales of the product are less than predicted sales of the product.

33. The method of claim 12, in which the step of determining whether to accept the offer comprises:
    determining a minimum price for a product; and
    accepting the offer if the offer price is greater than the minimum price.

34. The method of claim 33, in which the step of determining a minimum price comprises:
    determining a minimum price for the product based on an availability of the product.

35. The method of claim 33, in which the step of determining a minimum price comprises:
    determining a minimum price for the product based on a comparison of predicted sales of the product and actual sales of the product.

36. The method of claim 33, in which the step of determining a minimum price comprises:
    determining a minimum price for the product based on whether actual sales of the product are less than predicted sales of the product.

37. The method of claim 12, in which the financial account is a credit card account.

38. The method of claim 12, in which the step of determining whether to accept the offer comprises:
    delaying acceptance until a predetermined time.

* * * * *